United States Patent [19]

Kobayasi et al.

[11] Patent Number: 5,136,661
[45] Date of Patent: Aug. 4, 1992

[54] POSITION RECOGNIZING METHOD AND APPARATUS THEREFOR

[75] Inventors: Akira Kobayasi, Osaka; Nobutaka Taira, Hirakata; Seiji Mizuoka, Katano, all of Japan

[73] Assignee: Matsushita Electric Industrial Co., Ltd., Osaka, Japan

[21] Appl. No.: 665,228

[22] Filed: Mar. 6, 1991

[30] Foreign Application Priority Data

Mar. 8, 1990 [JP] Japan .................................. 2-57111

[51] Int. Cl.[5] .............................................. G06K 9/46
[52] U.S. Cl. .......................................... 382/48; 382/30; 382/51
[58] Field of Search ................ 382/30, 38, 48, 44, 382/51, 22, 32, 50, 60, 61, 34, 9; 358/96, 125, 101, 105, 107; 340/707

[56] References Cited

U.S. PATENT DOCUMENTS

| 4,635,293 | 1/1987 | Watanabe | 382/48 |
| 4,868,884 | 9/1989 | Miyazaki et al. | 382/30 |
| 4,972,499 | 11/1990 | Kurosawa | 382/30 |
| 5,003,616 | 3/1991 | Orita et al. | 382/48 |

Primary Examiner—Michael Razavi
Attorney, Agent, or Firm—Wenderoth, Lind & Ponack

[57] ABSTRACT

In a position recognizing method and an apparatus, an edge is detected by scanning a one-dimensional model including an edge to be recognized and one-dimensional edge detecting data of an image obtained via a camera so as to determine the difference between the density of the pixel of the one-dimensional model and the density of the corresponding pixel of the one-dimensional edge detecting data and the geometric balance therebetween. Then, the amount of data for detecting the edge becomes smaller and the pattern or parts can be recognized without controlling the binary level and at a high speed.

18 Claims, 9 Drawing Sheets $$fnm = \sum_i \sum_j fij / (2n-1)(2m-1)$$

$$D_{1n} = \Sigma \ |g(u) - fij(u)|$$

$$D_{2n} = |(C+D) \times L\ell - E \times Lr|$$

POSITION RECOGNIZING METHOD AND APPARATUS THEREFOR

BACKGROUND OF THE INVENTION

The present invention relates to a position recognizing method and apparatus therefor, comprising the step of taking an image or an image taking means for recognizing the position of a position correcting mark mounted on a substrate constituting an electronic circuit or the position of parts such as an IC pad.

Recently, a position recognition is performed by a pattern such as an image in no contact with the position correcting mark mounted on a substrate constituting an electronic circuit or the position of a lead such as a QFP(quadrilateral flat package).

The conventional method for recognizing the position of an object is described below with reference to FIG. 4 showing the construction of the conventional pattern position recognizing apparatus. The apparatus comprises a positioning table 21; a lighting device 23 to be utilized in inputting the image of the pattern of an object 22 placed on the positioning table 21; a television camera 24 mounted on a movable television camera supporting section 25; and a television camera control circuit 26 for controlling the television camera 24.

A video signal inputted to the television camera 24 is outputted to an analog-to-digital converting circuit 27 in which analog signals are converted into digital signals, namely, image data of 0 to 255 (256 gray levels). Then, the data is inputted to a microcomputer comprising a CPU, ROM, RAM, and input/output ports.

The pattern position recognizing apparatus comprises a judge control circuit (CPU) 28 to which an instruction is transmitted from a main controller or an operation panel; a binary control circuit 29 for digitizing an input image; a window frame control circuit 30 for setting a range as a window frame so as to process the image; a partial template take-out circuit 31 for sequentially taking out a partial two-dimensional pattern from the binary image within the window frame; a target template memory circuit 32 for storing a pattern to be recognized as a target template in advance; a template comparing circuit 33 for comparing the stored target template with the target template stored in advance; a representative position detecting circuit 34 for detecting the position of a representative template determined by the template comparing circuit 33 as being the closest to the target template. The recognized result is transmitted to the main controller.

The operation of the apparatus of the above construction is described below.

As shown in FIG. 5 showing a flowchart, at step 21, the object 22 having a pattern to be recognized is placed on the positioning table 21 and the lens of the television camera 24 is focused on the object 22 to input the image thereof. At step 22, the inputted image is digitized. At step 23, a range to be processed is set as a window frame. At step 24, a partial template is taken out of a two-dimensional pattern inside the window frame. At step 25, the exclusive OR of the partial template is compared with that of each pixel (bit) of the target template so as to examine whether or not the partial template is approximately equal to the target template. At step 26, the operations of steps 24 and 25 are performed for all two-dimensional patterns within the window frame and the position of a recognized point at the upper left of the partial template which is maximum of all the sums of the exclusive OR is judged as the representative position of the partial template. If it is judged at step 27 that there is an error in the above operation at step 26, the program returns to step 21 at which an image input is performed and the subsequent operations are carried out by differentiating the level of digitization.

According to the above construction, the partial template taken out of the two-dimensional pattern is compared with the sum of the exclusive OR of each pixel (bit) of the two-dimensional target template to check whether or not the partial template is approximately equal to the target template. Therefore, it takes a very long time to process data because of the large amount of data.

A position recognition is carried out with a low accuracy if a digitation is performed at the same level. This is because of density fluctuation caused by an illuminance change which may occur at the time of the image input or the sensitivity change of the television camera. As a result, the process for controlling the level of the digitization is complicated and the period of time required therefor is long.

Further, it is very difficult to recognize the position of a pattern such as a gold mark, placed on a ceramic substrate for use in an electronic circuit substrate, which does not uniformly glitter.

SUMMARY OF THE INVENTION

It is a first essential object of the present invention to provide a position recognizing method and apparatus which detects an edge of a pattern or parts, namely, the boundary of the density between the pattern or parts and the background using one-dimensional image data so as to reduce the amount of data and recognizes them by the density of an image without controlling the level of digitization.

It is a second object of the present invention to provide a position recognizing method and apparatus which reliably recognizes the position of even a low contrast image of a pattern and parts by adding an image emphasis to the function of the method and apparatus for accomplishing the first object.

It is a third object of the present invention to provide a position recognizing method and apparatus which detects a level simply and rapidly by utilizing the size of a pattern and parts in detecting a level at which the pattern or the parts and the background are separated from each other to be performed by the method and apparatus for accomplishing the first object.

It is a fourth object of the present invention to provide a position recognizing method and apparatus which detects an edge, to be carried out by the method and apparatus for accomplishing the first object, with a high accuracy.

It is a fifth object of the present invention to provide a position recognizing method and apparatus which accomplishes the detection in correspondence with a plurality of edges necessary to be made due to the expansion of a range to be recognized in the method and apparatus for accomplishing the first object, namely, the nonuniform surface of a pattern.

It is a sixth object of the present invention to provide a position recognizing method and apparatus which recognize edges, to be carried out by the method and apparatus for accomplishing the first object, with a higher accuracy.

It is a seventh object of the present invention to provide a position recognizing method and apparatus which recognizes the pattern or the parts, to be performed by the method and apparatus for accomplishing the first object, at a higher speed.

In accomplishing these and other objects, according to a first aspect of the present invention, there is provided a position recognizing method comprising the steps of: taking an image of an object having a pattern to be recognized via a camera so as to get an image signal taken out from the image; making an x-y-f space, where (f) is density of an x-y image plane, from the image signal, the space including a one-dimensional edge detecting data of the image; making an edge model $g(u)$ of a specified size including an edge of the pattern of the image on the basis of the one-dimensional edge detecting data in a direction which is not parallel to a line composed of a boundary between density in difference areas of the image; taking out a one-dimensional edge detecting data fij as a partial template, where fij is density of a pixel (i, j) in the image plane; scanning the edge model $g(u)$ and then calculating a sum ($D_{1n}$) of a difference in density between pixels corresponding to the one-dimensional edge detecting data fij(u) sequentially taken out as the partial template and the edge model $g(u)$; calculating a geometric unbalance degree ($D_{2n}$) between the edge model $g(u)$ and the data fij(u) with respect to a target point of the edge model $g(u)$; calculating an edge evaluating exponent based on the mis-match degree ($D_{1n}$) and the unbalance degree ($D_{2n}$) as follows: $Dn = m_1 D_{1n} + m_2 D_{2n}$ (where ($m_1$) and ($m_2$) are weight parameters) and mapping a point of an x-y-f space representing the partial template of the x-y-f space to an x-y-D space; and detecting a minimum point of a curve of the x-y-D space composed of representative points of the template mapped from the x-y-f space to the x-y-D space by the one-dimensional edge detecting converting means.

According to a second aspect of the present invention, there is provided a position recognizing apparatus comprising: a camera for taking an image of an object having a pattern to be recognized so as to get an image signal taken out from the image; a one-dimensional edge detecting data making means for making an x-y-f space, where (f) is density of an x-y image plane, from the image signal, the space including a one-dimensional edge detecting data of the image; a one-dimensional edge model making means for making an edge model $g(u)$ of a specified size including an edge of the pattern of the image on the basis of the one-dimensional edge detecting data in a direction unparallel with a line composed of a boundary between density in difference areas of the image; a one-dimensional edge detecting template taking-out means for taking out a one-dimensional edge detecting data fij as a partial template, where fij is density of a pixel (i, j) in the image plane; a mis-match degree calculating means for scanning the edge model $g(u)$ and then calculating a sum ($D_{1n}$) of difference in density between pixels corresponding to the one-dimensional edge detecting data fij(u) sequentially taken out as the partial template and the edge model $g(u)$; an unbalance degree calculating means for calculating a geometric unbalance degree ($D_{2n}$) between the edge model $g(u)$ and the data fij(u) with respect to a target point of the edge model $g(u)$; a one-dimensional edge detecting converting means for calculating an edge evaluating exponent based on the mis-match degree ($D_{1n}$) and the unbalance degree ($D_{2n}$) as follows: $Dn = m_1 D_{1n} +$ (where ($m_1$) and ($m_2$) are weight parameters) and mapping a point of an x-y-f space representing the partial template of the x-y-f space to an x-y-D space; and a minimum value detecting means for detecting a minimum point of a curve of the x-y-D space composed of representative points of the template mapped from the x-y-f space to the x-y-D space by the one-dimensional edge detecting converting means.

According to the first and second aspects of the present invention, an edge is detected by scanning a one-dimensional model including an edge to be recognized and one-dimensional edge detecting data of the obtained image so as to determine the difference between the density of the pixel of the one-dimensional model and the density of the corresponding pixel of the one-dimensional edge detecting data and the geometric balance therebetween. Then, the amount of data for detecting the edge becomes smaller and the pattern or parts can be recognized without controlling the binary level and at a high speed.

According to a third aspect of the present invention, there is provided the position recognizing method further comprising the steps of: detecting density of a background or the pattern of the image; setting as a window frame a range to be processed in the image; calculating a separating level between the density of the background and the pattern of the image; and emphasizing the image of the one-dimensional edge detecting data based on the detected density in accordance with the level.

According to a fourth aspect of the present invention, there is provided the position recognizing apparatus, wherein the detecting means detects density of a background or the pattern of the image; the apparatus further comprising a window frame setting means for setting as a window frame a range to be processed in the image, and an image emphasis means for calculating a separating level between the density of the background and the pattern of the image and emphasizing the image of the one-dimensional edge detecting data based on the detected density in accordance with the level.

According to the third and fourth aspects of the present invention, since the density of the background, pattern, or parts is detected and an image emphasis is performed, even a low contrast image can be recognized.

According to a fifth aspect of the present invention, there is provided the position recognizing method further comprising the steps of making a histogram of the one-dimensional edge detecting data and detecting a separating level between density of a background and the pattern of the image based on the pattern of a specified size so as to perform image emphasis of the one-dimensional edge detecting data by the detected density.

According to a sixth aspect of the present invention, there is provided the position recognizing apparatus further comprising an image emphasis means for making a histogram of the one-dimensional edge detecting data and detecting a separating level between density of a background and the pattern of the image based on the pattern of a specified size so as to perform image emphasis of the one-dimensional edge detecting data by the detected density.

According to the fifth and sixth aspects of the present invention, the separating level between the density of the background and the pattern or parts is detected by the density histogram of the one-dimensional edge detecting data so as to perform the image emphasis of the one-dimensional edge detecting data. Therefore, the image of even a low contrast can be recognized.

According to a seventh aspect of the present invention, there is provided the position recognizing method further comprising the steps of mapping only representative points of the template as candidate points when an edge evaluating exponent is within an allowable range and calculating a weighted average of a plurality of the candidate points (x, y, D) by an edge evaluating exponent (Dn) so as to detect an edge (x, y).

According to an eighth aspect of the present invention, there is provided the position recognizing apparatus, wherein the one-dimensional edge detecting converting means maps only representative points of the template as candidate points when an edge evaluating exponent is within an allowable range and calculates a weighted average of a plurality of the candidate points (x, y, D) by an edge evaluating exponent (Dn) so as to detect an edge (x, y).

According to the seventh and eighth aspects of the present invention, since a preferable edge evaluating exponent is detected as a candidate point and the calculation of a weighted average is performed, an image can be recognized stably and with a high accuracy.

According to a ninth aspect of the present invention, there is provided the position recognizing method further comprising the steps of mapping only representative points of the template as candidate points when an edge evaluating exponent is within an allowable range in detecting a plurality of edges according to the one-dimensional edge detecting data so as to detect an edge and performing distance verification of the plurality of the candidate points based on a distance relationship between edges to be recognized.

According to a tenth aspect of the present invention, there is provided the position recognizing apparatus, wherein the one-dimensional edge detecting converting means maps only representative points of the template as candidate points when an edge evaluating exponent is within an allowable range in detecting a plurality of edges according to the one-dimensional edge detecting data so as to detect an edge and performs distance verification of the plurality of the candidate points based on a distance relationship between edges to be recognized.

According to the ninth and tenth aspects of the present invention, since a position recognition is carried out in combination of a plurality of candidate points and a distance verification, it is possible to recognize the position of a plurality of edges and the image of parts, the surface of which is ununiform.

According to an eleventh aspect of the present invention, there is provided the position recognizing method further comprising the steps of grouping points mapped as the candidate points according to the distance relationship between the mapped candidate points, calculating a weighted average of candidate points (x, y, D) of each group, and detecting the candidate points (x, y, D) as the representative value of each group so as to measure distance.

According to a twelfth aspect of the present invention, there is provided the position recognizing apparatus further comprising means for grouping points mapped as the candidate points according to the distance relationship between the mapped candidate points, calculating a weighted average of candidate points (x, y, D) of each group, and detecting the candidate points (x, y, D) as the representative value of each group so as to measure distance.

According to the eleventh and twelfth aspects of the present invention, it is possible to recognize the position of a plurality of edges and the image of parts, the surface of which is ununiform with a high accuracy, because a grouping processing and a weighted average calculation are additionally performed to the method and apparatus according to the ninth and tenth aspects of the present invention.

According to a thirteenth aspect of the present invention, there is provided the position recognizing method further comprising the steps of, in detecting the candidate points, setting a maximum number of a plurality of candidate points and updating a value of the allowable range when a number of candidate points becomes maximum during scanning of the edge model.

According to a fourteenth aspect of the present invention, there is provided the position recognizing apparatus further comprising means for, in detecting the candidate points, setting a maximum number of a plurality of candidate points and updating a value of the allowable range when a number of candidate points becomes maximum during scanning of the edge model.

According to the thirteenth and fourteenth aspects of the present invention, since the allowable range of the edge evaluating exponent is updated when candidate points are detected, an image can be recognized at a high speed.

BRIEF DESCRIPTION OF THE DRAWINGS

These and other objects and features of the present invention will become apparent from the following description taken in conjunction with the preferred embodiments thereof with reference to the accompanying drawings, in which:

FIG. 4 is a view showing the structure of a

DETAILED DESCRIPTION OF THE INVENTION

Figure 1:
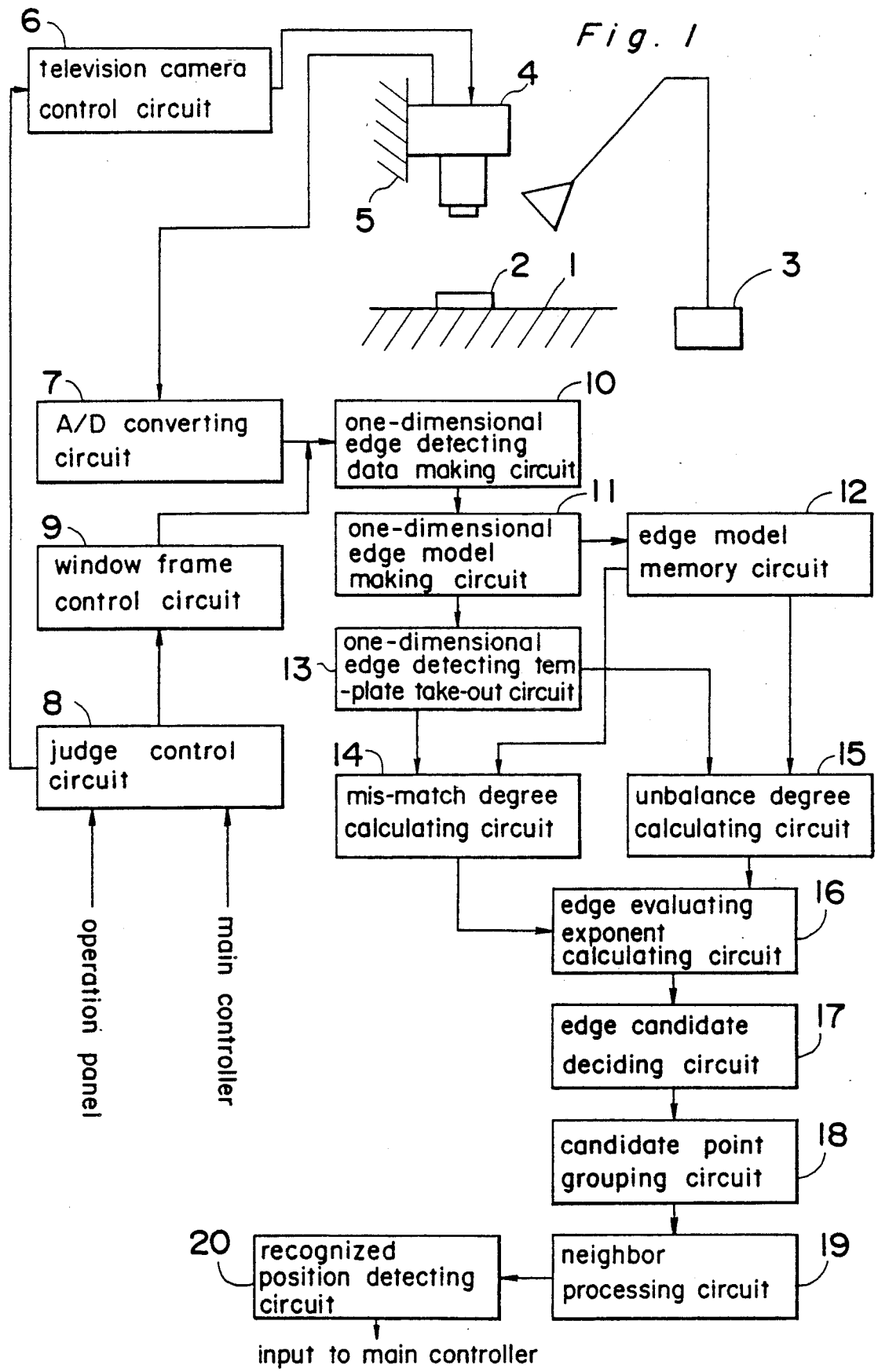
FIG. 1 is a view showing the structure of a position recognizing apparatus according to an embodiment of the present invention.

Before the description of the present invention proceeds, it is to be noted that like parts are designated by like reference numerals throughout the accompanying drawings.

A position recognizing method and apparatus for carrying out the method, according to an embodiment of the present invention, are described with reference to FIG. 1 and FIG. 3a through FIG. 3m.

FIG. 1 shows an example of the construction of the apparatus. The apparatus comprises a lighting device 3 being utilized to input the image of an object 2 placed on a positioning table 1; a television camera 4 mounted on a movable camera supporting section 5; and a control circuit 6 for controlling the television camera 4. A video signal, with respect to the object 2, inputted to the television camera 4 is outputted to an analog-to-digital converting circuit 7 in which analog signals are converted into digital signals, namely, image data of 0 to 255 (256 gray levels). Then, the data is inputted to a microcomputer comprising a CPU, ROM, RAM, and input/output ports.

The apparatus further comprises a judge control circuit 8 (CPU) to which an instruction is transmitted from a main controller or an operation panel; a window frame control circuit 9 for setting as a window frame a range which is processed in the image; a one-dimensional edge detecting data making circuit 10 for making one-dimensional edge detecting data by performing the smoothing of the image in the window frame in a perpendicular and horizontal direction with respect to a detecting direction; a one-dimensional edge model making circuit 11 for making an edge model of an appropriate size, for example, sixteen pixel lines from among a plurality of samples so as to detect a one-dimensional edge; an edge model memory circuit 12 for storing the model of the edge made by the one-dimensional edge model making circuit 11; a one-dimensional edge detecting template take-out circuit 13 for partially taking out a template from the one-dimensional edge detecting data; a mis-match degree calculating circuit 14 for calculating the sum of the difference between the density of the pixel of the one-dimensional edge detecting template an the density of the corresponding pixel of the edge model by scanning the edge model of the one-dimensional edge detecting data; an unbalance degree calculating circuit 15 for calculating an exponent for evaluating the geometric balance between the one-dimensional edge detecting template and the edge model; an edge evaluating exponent calculating circuit 16 for calculating an exponent to be used to synthetically evaluate a mis-match degree and an unbalance degree; an edge candidate judging circuit 17 for detecting, as a candidate point of the edge, the minimum value of edge evaluating exponent of each edge detecting template or the representative value of a template within an appropriate allowable range; a candidate point grouping circuit 18 for grouping candidate points according to distance; a neighbor processing circuit 19 for performing the calculation of the weighted average of elements (coordinates) within each group by the edge evaluating exponent; and a recognized position detecting circuit 20 for detecting a recognized position by verifying the distance with respect to representative points of each group detected by the neighbor processing. The position recognized by the recognized position detecting circuit 20 is inputted to the main controller.

The operation of the apparatus of the above construction is described below.

Figure 2:
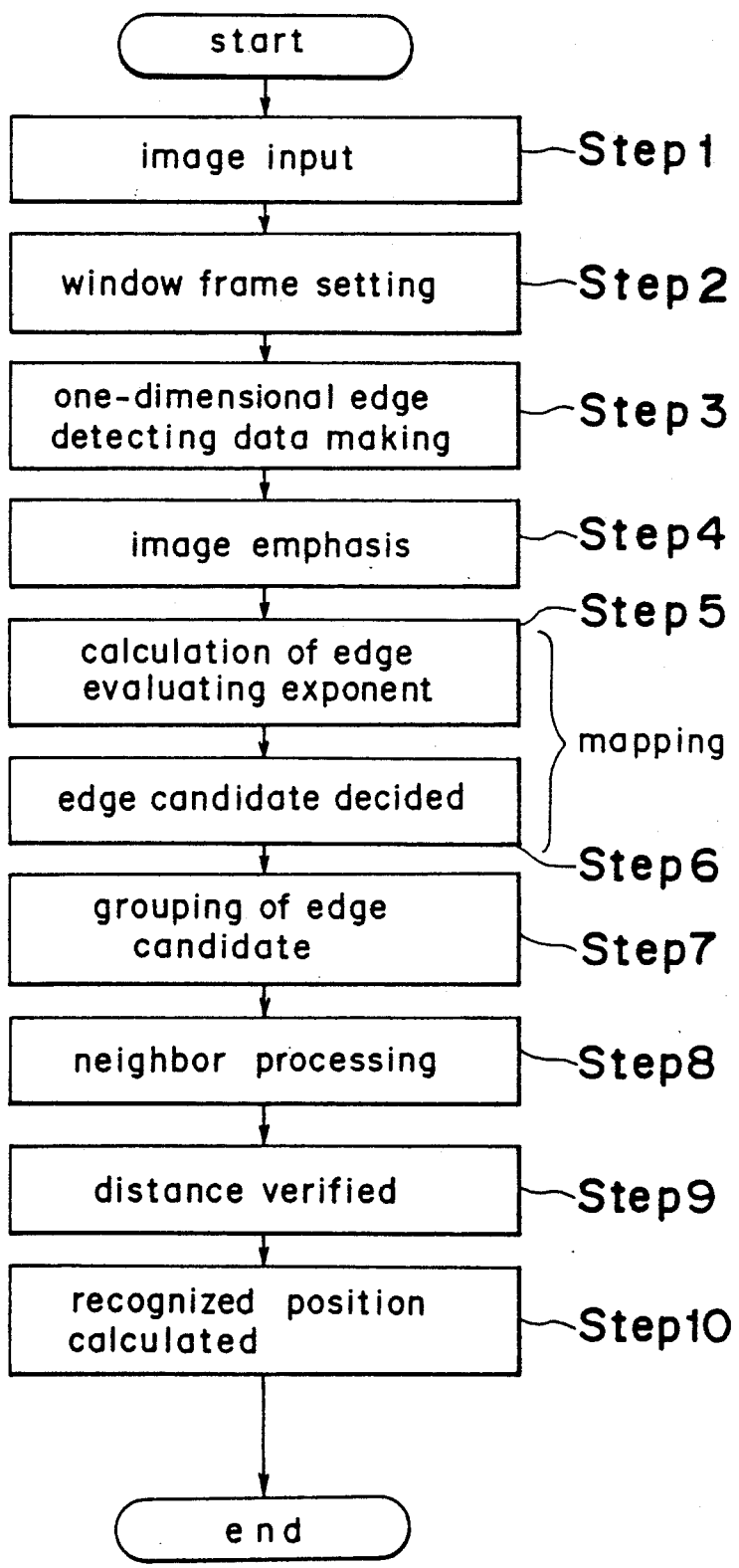
FIG. 2 is a flowchart showing the recognizing method to be carried out by the position recognizing apparatus.

At step 1, as shown in the flowchart of FIG. 2, the object 2 having a pattern to be recognized is placed on the positioning table 1. The lens of the television camera 4 is focused on the object 2 to input the image of the object 2 to an image input section. At step 2, the window frame setting means sets a window frame in the inputted image so as to process the image.

Figure 3A:
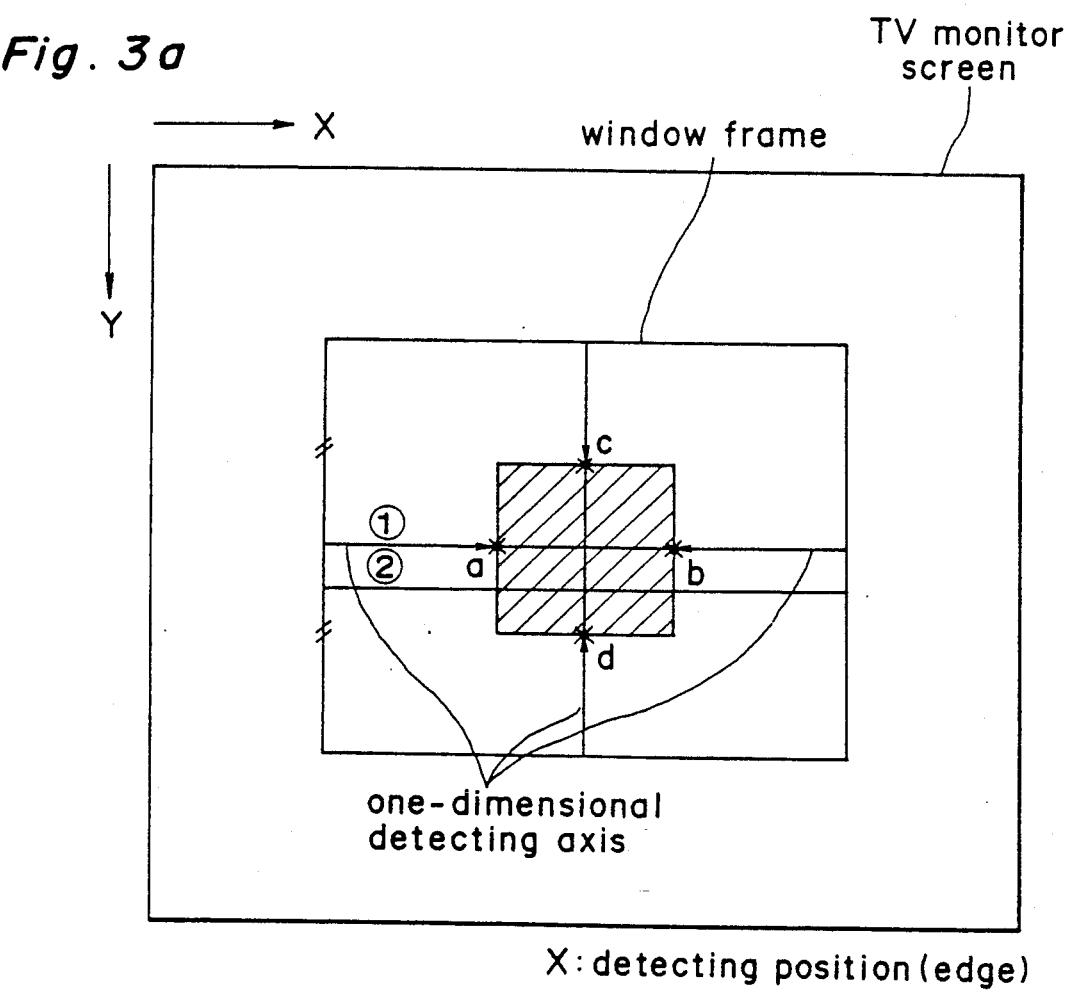
FIG. 3a is a view for explaining the method for scanning the model of an edge according to the embodiment.
Figure 3B:
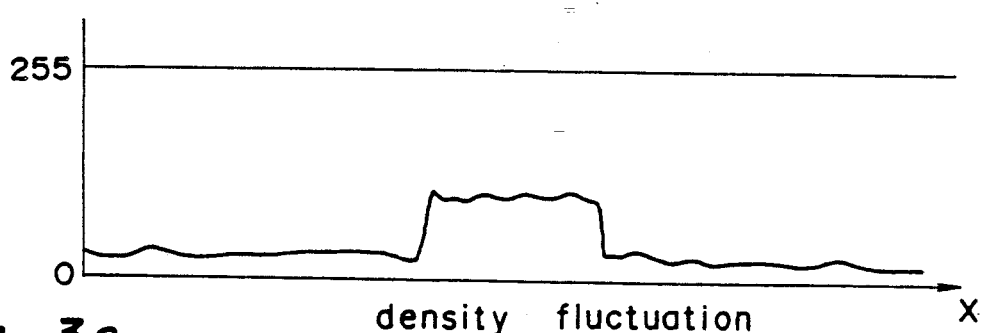
FIG. 3b is a view showing the density fluctuation of an object image.
Figure 3C:
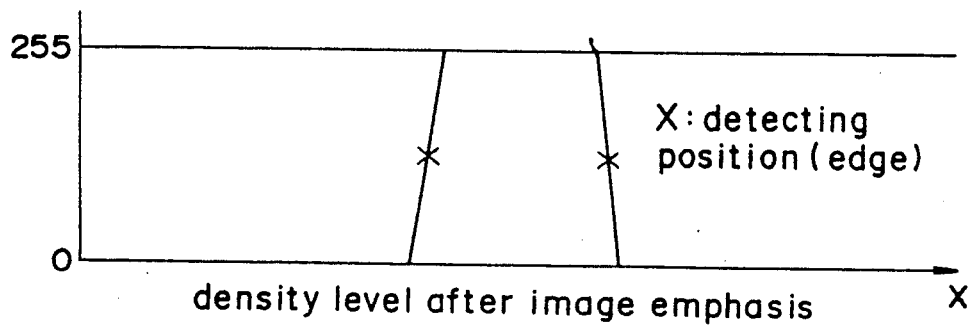
FIG. 3c is a view showing the density fluctuation which occurs after the image is emphasized.
Figure 3D:
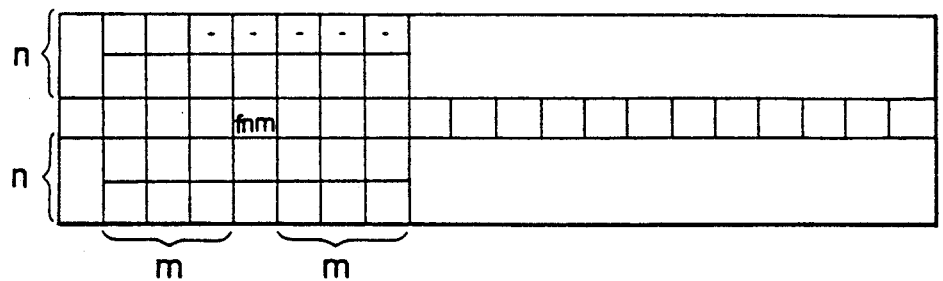
FIG. 3d is a view showing a smoothing processing.

As shown in FIG. 3a, at step 3, straight lines passing through the center point in vertical direction of the window frame and being parallel with X-axis and Y-axis are selected as one-dimensional edge detecting axes. A smoothing processing or a weighted smoothing processing is performed in the size of, for example, $(2n + 1) \times (2m + 1)$ as shown in FIG. 3d. Then, the image data of the one-dimensional edge detecting axes is made.

Figure 3E:
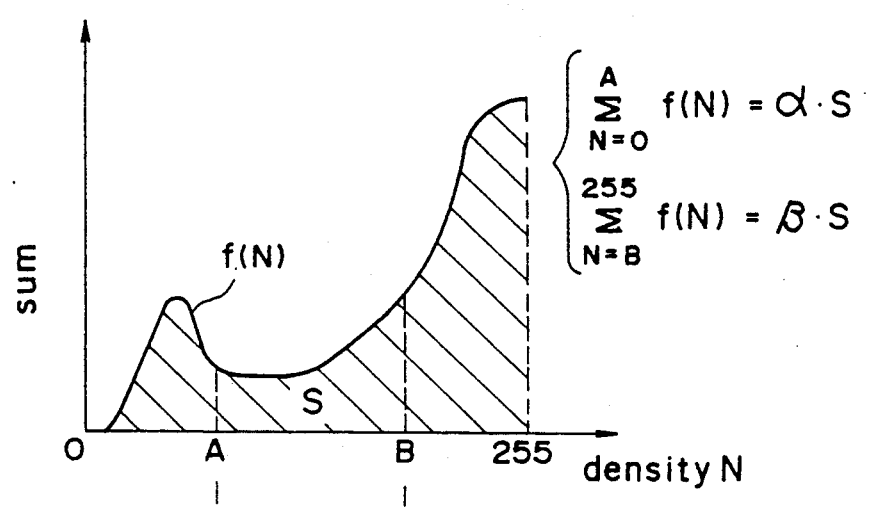
FIG. 3e is a view for explaining the density histogram of one-dimensional edge detecting data.
Figure 3F:
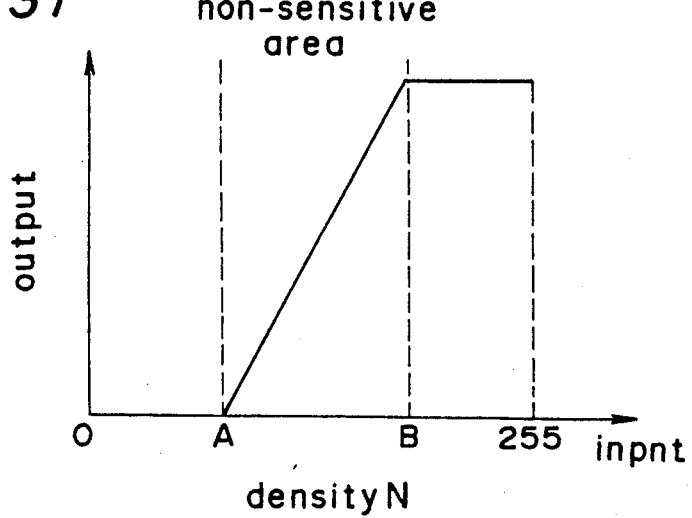
FIG. 3f is a view for explaining an emphasized image.
Figure 3G:
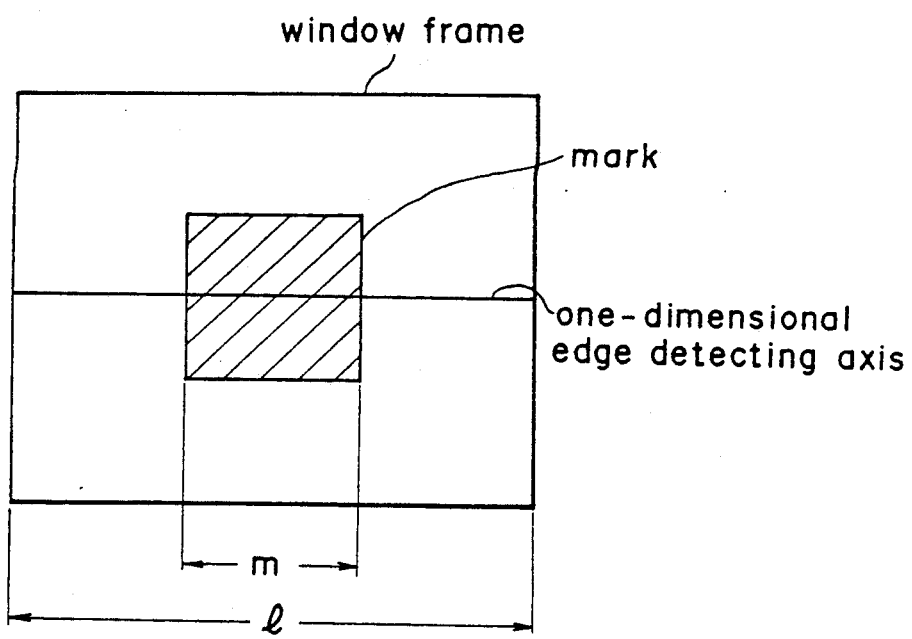
FIG. 3g is a view for explaining the relationship between the size of a mark and a window frame.
Figure 3H:
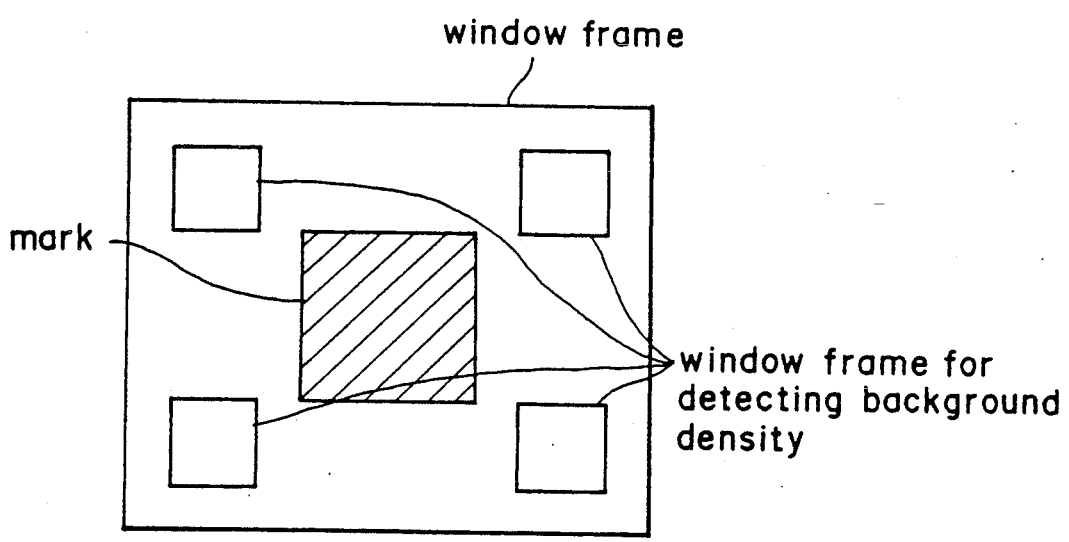
FIG. 3h is a view for explaining the method for detecting the density of the background of an object.
Figure 3I:
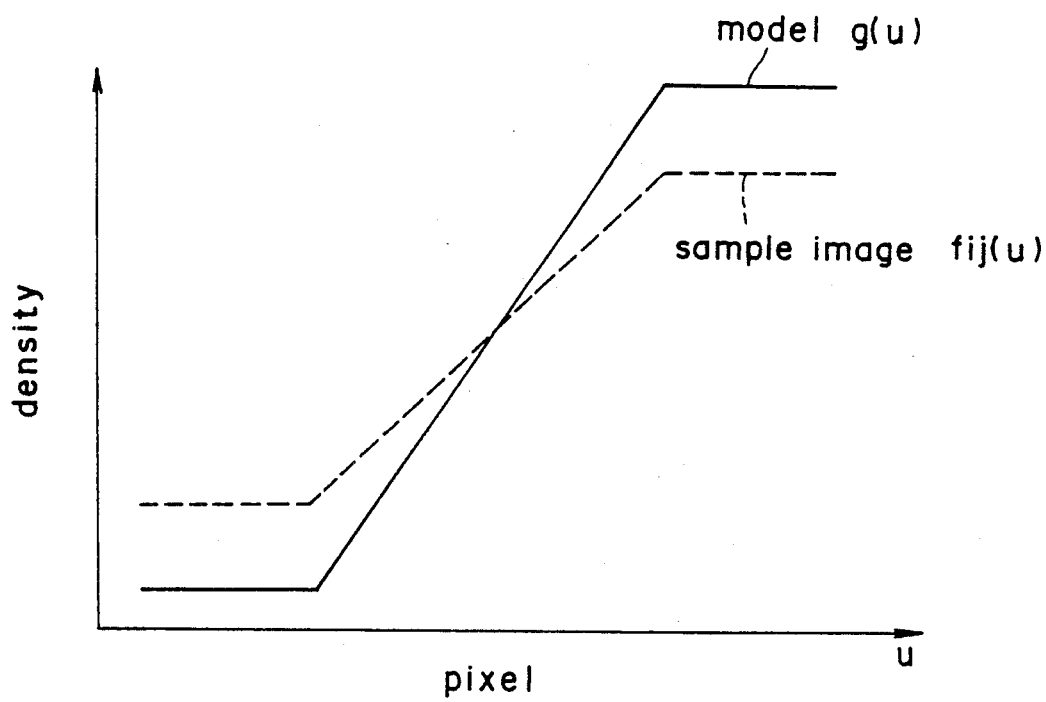
FIG. 3i is a view for explaining the method for calculating a mis-match degree.
Figure 3J:
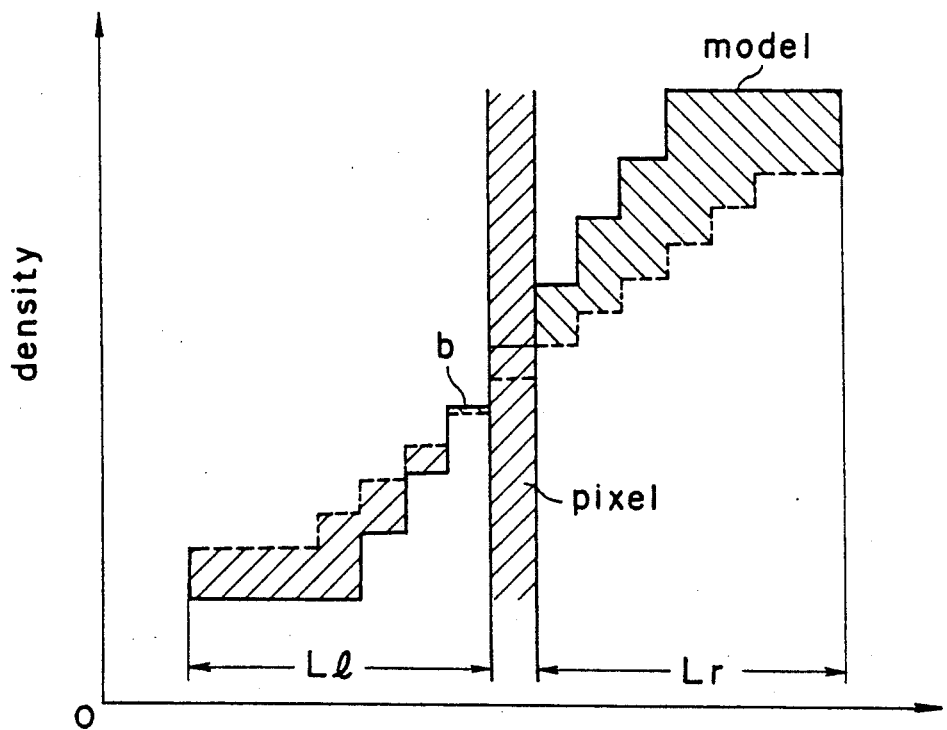
FIG. 3j is a view for explaining the method for calculating an unbalance degree.

At step 4, as shown in FIG. 3e, the density histogram of the image data of the one-dimensional edge detecting axes made as above is formed. As shown in FIG. 3f, an image emphasis is performed according to densities (A) and (B). The following equations are used to determine the densities (A) and (B).

$$\sum_{N=0}^{A} f(N) = \alpha \cdot S$$

$$\sum_{N=B}^{255} f(N) = \beta \cdot S$$

where (S) is the area shown by the oblique lines of FIG. 3e and ($\alpha$) and ($\beta$) are area ratios. When such a mark as shown in FIG. 3a is recognized, the mark and the background can be taken out at a certain density, however, in this embodiment, the images of the mark and the background are emphasized in consideration of a non-sensitive area as shown in FIGS. 3e and 3f. That is, ($\alpha$) and ($\beta$) are calculated by registering a mark size (m) and a window frame size (l) as shown in FIG. 3g:

$\alpha = (m/l) \times (k/100)$ $\beta = (m/l) \times (k/100)$ where (k) is an adjustable parameter to be used except the non-sensitive area. When a mark configuration is unstable, the densities (A) and (B) can be determined by the density of the background or the mark. That is, as shown in FIG. 3h, a plurality of density detecting window frames are set in the window frame; the average, maximum or minimum value of the density of each density detecting window frame is detected as a representative value; a representative value remotest from other representative values is deleted supposing that dust or marks exist besides the background within the density detecting window frame (the window frame is set so that the mark can exist only in one density detecting window frame); the average value, maximum or minimum value of the remaining representative values is detected to set the detected value as the density of the background; and similarly to the above, the densities (A) and (B) are determined by excluding a non-sensitive area.

According to the detected one-dimensional edge data obtained after emphasizing the image, the density of an edge model g(u) ((u) is a position in an edge model) of an appropriate size is scanned which includes an edge to be recognized stored in advance. The edge model may be formed by finding the average value of each pixel based on image data of a plurality of samples. The mis-match degree calculating circuit 14 finds as a mis-match degree Dm, the sum of the difference between the density of the edge model g(u) and the density of a partial template fij(u) of the one-dimensional edge detecting data sequentially taken out ((u) is a position inside the template; (i) and (j) are positions representing the template on x-y plane), that is, the sum of the difference in density between the pixels corresponding to the edge model g(u) and the template fij(u). In addition, the un-balance degree calculating circuit 15 calculates the geometrical unbalance degree $D_{2n}$ between g(u) and fij(u) with respect to a sampling point of g(u). Then, the edge evaluating exponent evaluating circuit 16 calculates the edge evaluating exponent D as follows: The mis-match degree $D_{1n}$ and the unbalance degree $D_{2n}$ are synthetically evaluated by the evaluating exponent Dn:

$$Dn = m_1 D_{1n} + m_2 D_{2n}$$

Where ($m_1$) and ($m_2$) are weight parameters (step 5). A point of an x-y-f space is mapped to an x-y-D space. The edge candidate judging circuit 17 detects the minimum point of a curve of the x-y-D space and judges the values of x and y of the minimum point as the position of the edge which is to be recognized.

Figure 3K:
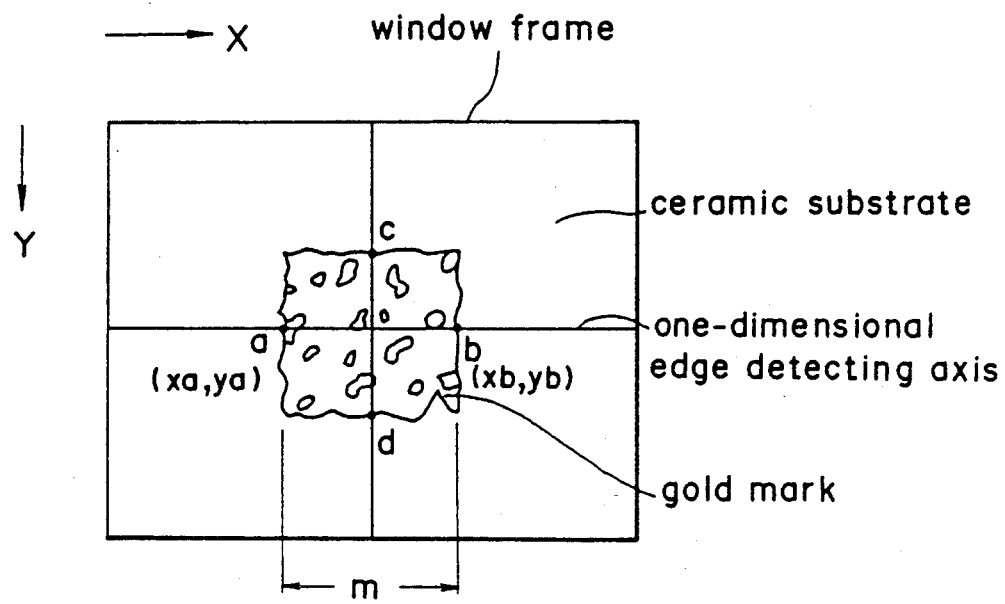
FIG. 3k is a view for explaining a gold mark on a ceramic substrate.
Figure 3L:
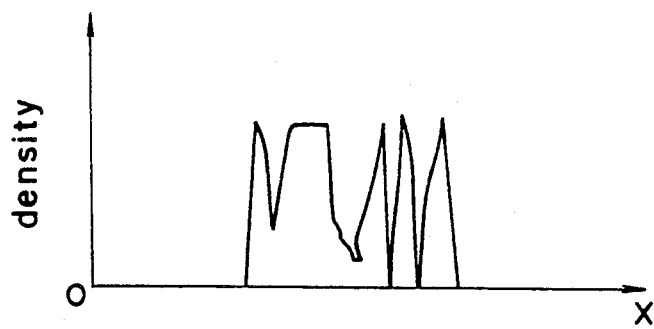
FIG. 3l is a view for explaining a density fluctuation which occurs after an image is emphasized in recognizing the gold mark on the ceramic substrate.

However, if the density inside the mark such as the gold mark on a ceramic substrate is not uniform as shown in FIG. 3k, the one-dimensional edge detecting data obtained after the emphasis of the image is performed is as shown in FIG. 3l. Therefore, there is a possibility that the position of the edge is erroneously recognized. In order to avoid such an erroneous recognition, the mis-match degree $D_{1n}$, the unbalance degree $D_{2n}$, the edge evaluating exponent Dn are verified during the scanning of the edge model, so that only representative values of the template fij(u) within an appropriate allowable range of the x-y-f space are mapped to the x-y-D space (step 6).

When the gold mark on the ceramic substrate such as shown in FIG. 3k is recognized according to the above method, first, the edge candidate judging circuit 17 detects candidate points corresponding to edges (a) and (b) (step 6). Then, at step 7, the candidate grouping circuit 18 groups candidate points of the edges (a) and (b) according to a distance relationship between them. At step 8, the neighbor processing circuit 19 performs the calculation of the weighted average of elements (i, j, Dn) of each group as follows to detect the representative value as the candidate point of each group.

$$x = (\Sigma i \cdot Dn) / \Sigma Dn$$

$$y = (\Sigma j \cdot Dn) / \Sigma Dn$$

Then, the following calculation is performed based on the relationship between the distance of a pair of edges of candidate points corresponding to the edges (a) and (b) and the size of the mark so as verify the value of (d), i.e., to detect the minimum value of (d).

$$d = |m^2 - (xa - xb)^2|$$

Thus, a pair of edges which is most approximate to the size of the mark is recognized as the real edges (step 9). If $d > \alpha$ (($\alpha$) is allowable difference of distance), an image recognizing processing using next one-dimensional edge detecting axis ②  is carried out as shown in FIG. 3a because an appropriate pair of edges has not been detected.

When the edges (a) and (b) are detected, the image processing is repeated using a one-dimensional edge detecting axis passing through the median of the line (ab) so as to detect the edges (c) and (d).

When the edges (a), (b), (c), and (d) are detected, the position of the center of the mark is calculated according to these four points corresponding to these four edges (a), (b), (c), and (d). Thus, the center position is set as a recognized position (step 10).

Figure 3M:
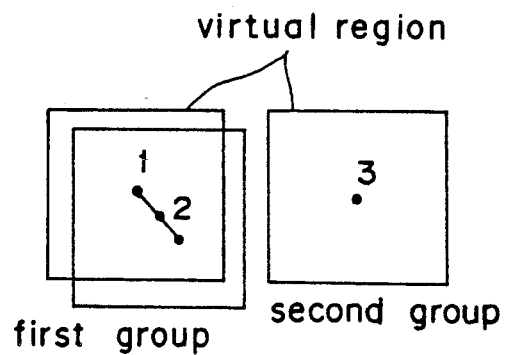
FIG. 3m is a view for explaining the method for performing a grouping.
Figure 4:
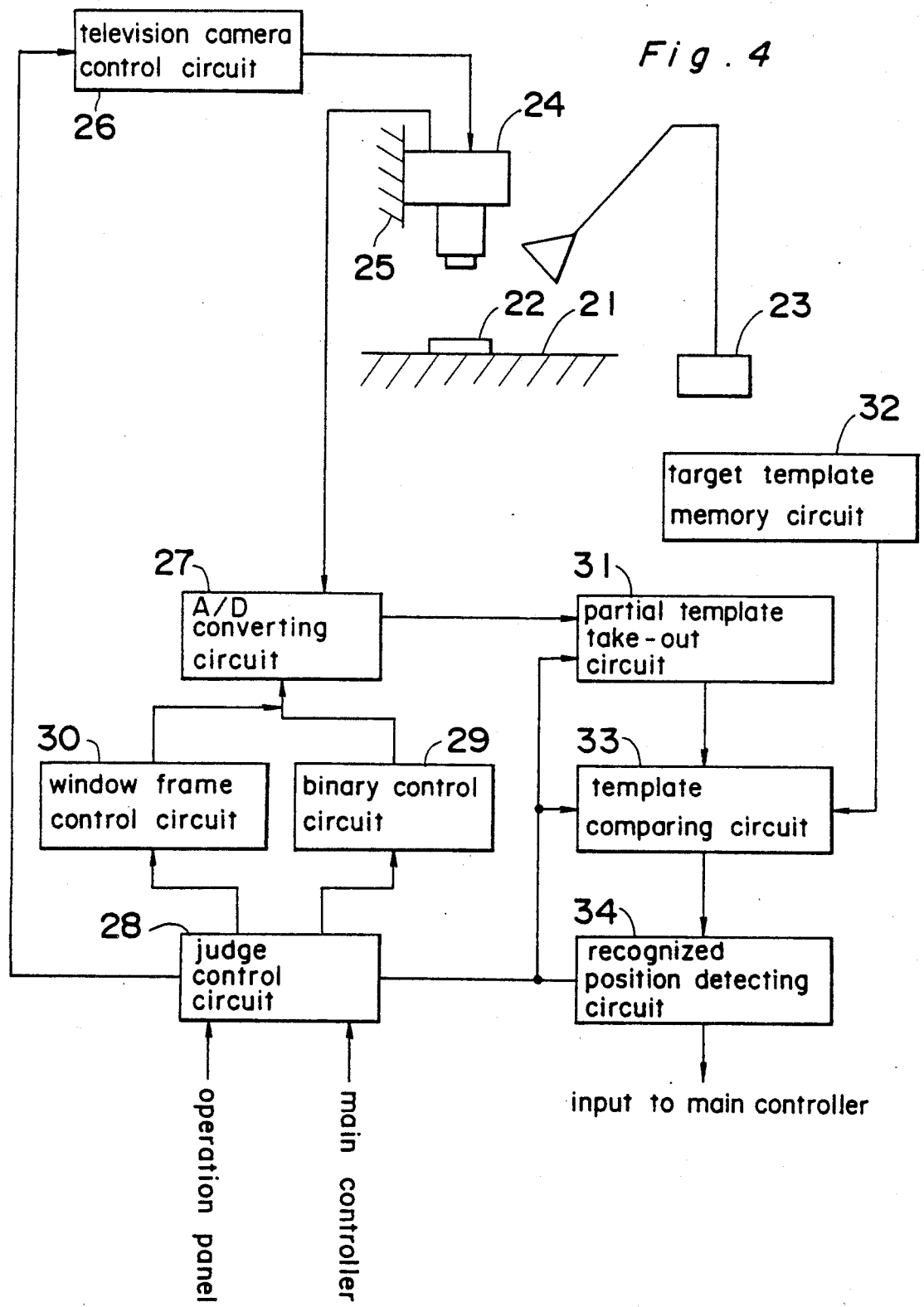
Figure 5:
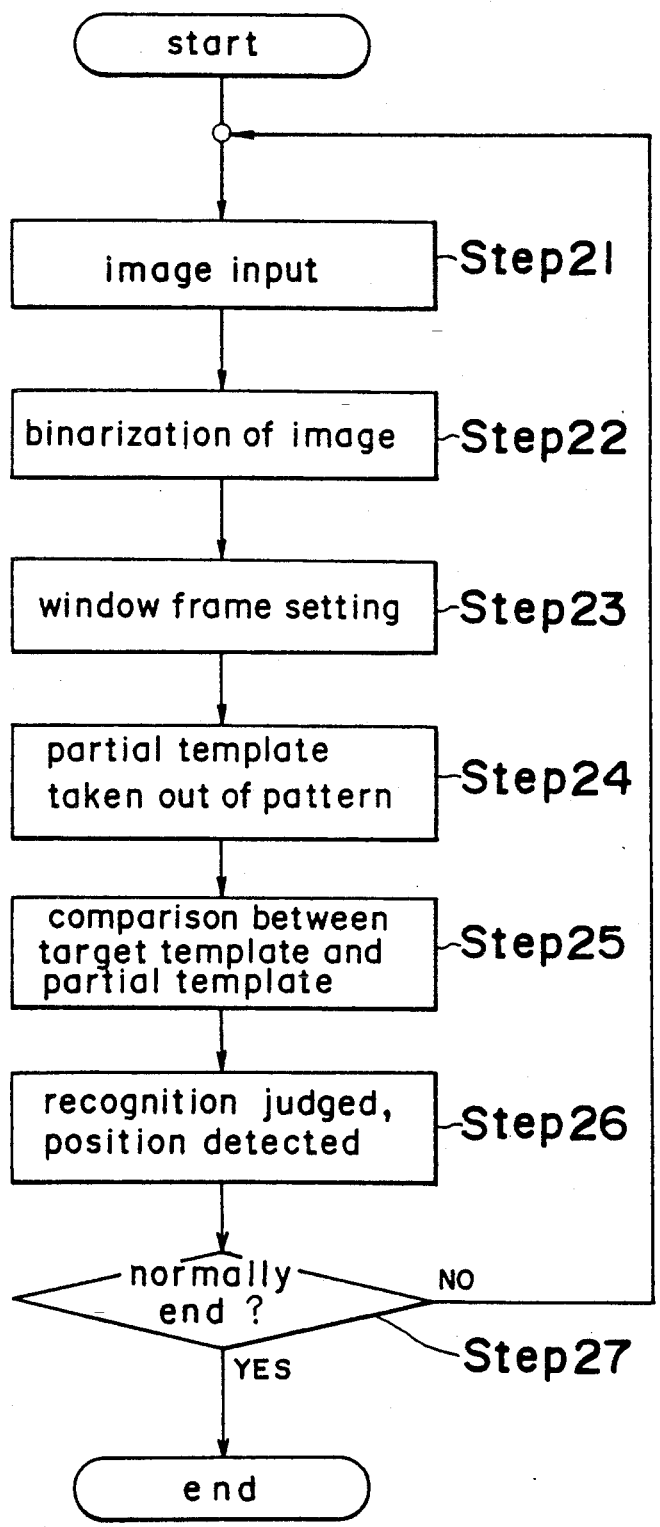
FIG. 5 is a flowchart showing the operation of the recognizing apparatus shown in FIG. 4.

Candidate points are grouped as follows: A number is assigned to a candidate point in the order of detection as shown in FIG. 3m. A region of a rectangle or a circle is set with a candidate point 1 being the center thereof. If a candidate point 2 is positioned within the region, the candidate point 2 is regarded as belonging to the group, i.e. a first group in FIG. 3m, to which the candidate point belongs. Then, a region is set with the midpoint of the candidate points 1 and 2 being the center thereof. Then, candidate points are repeatedly grouped. If the following candidate point, namely, a candidate point 3 is not positioned within the region, it is judged that the subsequent candidate point belongs to a different group, i.e. a second group in FIG. 3m. Similarly, the subsequent candidate points are grouped with the candidate point 3 being the center of a new region.

According to the invention, the following advantages are obtained: a pattern can be recognized without controlling the binary level and at a high speed. The image of a low contrast can be recognized. An image can be recognized stably and with a high accuracy It is possible to recognize a plurality of edges and a pattern of the image with a high precision, the surface of which is ununiform.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A position recognizing method comprising the steps of:

taking an image of an object having a pattern to be recognized via a camera so as to get an image signal taken out from the image;

making an x-y-f space, where (f) is density of an x-y image plane, from the image signal, the space including a one-dimensional edge detecting data of the image;

making an edge model g(u) of a specified size including an edge of the pattern of the image on the basis of the one-dimensional edge detecting data in a direction unparallel with a line composed of a boundary between density in difference areas of the image;

taking out a one-dimensional edge detecting data fij as a partial template, where fij is density of a pixel (i, j) in the image plane;

scanning the edge model g(u) and then calculating a sum ($D_{1n}$) of difference in density between pixels corresponding to the one-dimensional edge detecting data fij(u) sequentially taken out as the partial template and the edge model g(u);

calculating a geometric unbalance degree ($D_{2n}$) between the edge model g(u) and the data fij(u) with respect to a target point of the edge model g(u);

calculating an edge evaluating exponent based on a mis-match degree $D_{1n}$) and the unbalance degree ($D_{2n}$) as follows: $Dn = m_1 D_{1n} + m_2 D_{2n}$ (where ($m_1$) and ($m_2$) are weight parameters) and mapping a point of an x-y-f space representing the partial template of the x-y-f space to an x-y-D space; and detecting a minimum point of a curve of the x-y-D space composed of representative points of the template mapped from the x-y-f space to the x-y-D space by the one-dimensional edge detecting converting means.

2. The position recognizing method as claimed in claim 1, further comprising the steps of:
   detecting density of a background or the pattern of the image;
   setting as a window frame a range to be processed in the image;
   calculating a separating level between the density of the background and the pattern of the image; and
   emphasizing the image of the one-dimensional edge detecting data based on the detected density in accordance with the level.

3. The position recognizing method as claimed in claim 1, further comprising the steps of making histogram of the one-dimensional edge detecting data and detecting a separating level between density of a background and the pattern of the image based on the pattern of a specified size so as to perform image emphasis of the one-dimensional edge detecting data by the detected density.

4. The position recognizing method as claimed in claim 1, further comprising the steps of mapping only representative points of the template as candidate points when an edge evaluating exponent is within an allowable range and calculating a weighted average of a plurality of the candidate points (x, y, D) by an edge evaluating exponent (Dn) so as to detect an edge (x, y).

5. The position recognizing method as claimed in claim further comprising the steps of mapping only representative points of the template as candidate points when an edge evaluating exponent is within an allowable range in detecting a plurality of edges according to the one-dimensional edge detecting data so as to detect an edge and performing distance verification of the plurality of the candidate points based on a distance relationship between edges to be recognized.

6. The position recognizing method as claimed in claim 5, further comprising the steps of grouping points mapped as the candidate points according to the distance relationship between the mapped candidate points, calculating a weighted average of candidate points (x, y, D) of each group, and detecting the candidate points (x, y, D) as the representative value of each group so as to measure distance.

7. The position recognizing method as claimed in claim 4, further comprising the steps of, in detecting the candidate points, setting a maximum number of a plurality of candidate points and updating a value of the allowable range when a number of candidate points becomes maximum during scanning of the edge model.

8. The position recognizing method as claimed in claim 5, further comprising the steps of, in detecting the candidate points, setting a maximum number of a plurality of candidate points and updating a value of the allowable range when a number of candidate points becomes maximum during scanning of the edge model.

9. The position recognizing method as claimed in claim 6, further comprising the steps of, in detecting the candidate points, setting a maximum number of a plurality of candidate points and updating a value of an allowable range when a number of candidate points becomes maximum during scanning of the edge model.

10. A position recognizing apparatus comprising:
    a camera for taking an image of an object having a pattern to be recognized so as to get an image signal taken out from the image;
    a one-dimensional edge detecting data making means for making an x-y-f space, where (f) is density of an x-y image plane, from the image signal, the space including a one-dimensional edge detecting data of the image;
    a one-dimensional edge model making means for making an edge model g(u) of a specified size including an edge of the pattern of the image on the basis of the one-dimensional edge detecting data in a direction unparallel with a line composed of a boundary between density in difference areas of the image;
    a one-dimensional edge detecting template takingout means for taking out a one-dimensional edge detecting data fij as a partial template, where fij is density of a pixel (i, j) in the image plane;
    a mis-match degree calculating means for scanning the edge model g(u) and then calculating a sum ($D_{1n}$) of difference in density between pixels corresponding to the one-dimensional edge detecting data fij(u) sequentially taken out as the partial template and the edge model g(u);
    an unbalance degree calculating means for calculating a geometric unbalance degree ($D_{2n}$) between the edge model g(u) and the data fij(u) with respect to a target point of the edge model g(u);
    a one-dimensional edge detecting converting means for calculating an edge evaluating exponent based on the mis-match degree ($D_{1n}$) and the unbalance degree ($D_{2n}$) as follows $Dn = m_1 D_{1n} + m_2 D_{2n}$ (where ($m_1$) and ($m_2$) are weight parameters) and mapping a point of an x-y-f space representing the partial template of the x-y-f space to an x-y-D space; and
    a minimum value detecting means for detecting a minimum point of a curve of the x-y-D space composed of representative points of the template mapped from the x-y-f space to the x-y-D space by the one-dimensional edge detecting converting means.

11. The position recognizing apparatus as claimed in claim 10, wherein the detecting means detects density of a background or the pattern of the image; the apparatus further comprising a window frame setting means for setting as a window frame a range to be processed in the image, and an image emphasis means for calculating a separating level between the density of the background and the pattern of the image and emphasizing the image of the one-dimensional edge detecting data based on the detected density in accordance with the level.

12. The position recognizing apparatus as claimed in claim 10, further comprising an image emphasis means for making histogram of the one-dimensional edge detecting data and detecting a separating level between density of a background and the pattern of the image based on the pattern of a specified size so as to perform image emphasis of the one-dimensional edge detecting data by the detected density.

13. The position recognizing apparatus as claimed in claim 10, wherein the one-dimensional edge detecting converting means maps only representative points of the template as candidate points when an edge evaluating exponent is within an allowable range and calculates a weighted average of a plurality of the candidate points (x, y, D) by an edge evaluating exponent (Dn) so as to detect an edge (x, y).

14. The position recognizing apparatus as claimed in claim 10, wherein the one-dimensional edge detecting converting means maps only representative points of the template as candidate points when an edge evaluating exponent is within an allowable range in detecting a plurality of edges according to the one-dimensional edge detecting data so as to detect an edge and performs distance verification of the plurality of the candidate points based on a distance relationship between edges to be recognized.

15. The position recognizing apparatus as claimed in claim 14, further comprising means for grouping points mapped as the candidate points according to the distance relationship between the mapped candidate points, calculating a weighted average of candidate points (x, y, D) of each group, and detecting the candidate points (x, y, D) as the representative value of each group so as to measure distance.

16. The position recognizing apparatus as claimed in claim 13, further comprising means for, in detecting the candidate points, setting a maximum number of a plurality of candidate points and updating a value of the allowable range when a number of candidate points becomes maximum during scanning of the edge model.

17. The position recognizing apparatus as claimed in claim 14, further comprising means for, in detecting the candidate points, setting a maximum number of a plurality of candidate points and updating a value of the allowable range when a number of candidate points becomes maximum during scanning of the edge model.

18. The position recognizing apparatus as claimed in claim 15, further comprising means for, in detecting the candidate points, setting a maximum number of a plurality of candidate points and updating a value of an allowable range when a number of candidate points becomes maximum during scanning of the edge model.

* * * * *